United States Patent
Tsai et al.

(10) Patent No.: US 11,394,423 B2
(45) Date of Patent: *Jul. 19, 2022

(54) PSEUDO CHANNEL HOPPING USING SCAN DWELL TIMES IN MESH NETWORKS WITHOUT TIME SYNCHRONIZATION

(71) Applicant: TEXAS INSTRUMENTS INCORPORATED, Dallas, TX (US)

(72) Inventors: Kaichien Tsai, Allen, TX (US); Arvind Kandhalu Raghu, Plano, TX (US); Ramanuja Vedantham, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 87 days.

This patent is subject to a terminal disclaimer.

(21) Appl. No.: 16/856,161

(22) Filed: Apr. 23, 2020

(65) Prior Publication Data
US 2020/0322001 A1 Oct. 8, 2020

Related U.S. Application Data

(63) Continuation of application No. 15/424,692, filed on Feb. 3, 2017, now Pat. No. 10,644,746.
(Continued)

(51) Int. Cl.
*H04B 1/713* (2011.01)
*H04B 17/318* (2015.01)
(Continued)

(52) U.S. Cl.
CPC ............. *H04B 1/713* (2013.01); *H04B 17/26* (2015.01); *H04B 17/318* (2015.01);
(Continued)

(58) Field of Classification Search
CPC ...... H04B 1/713; H04B 17/26; H04B 17/318; H04B 2001/7154; H04W 4/80;
(Continued)

(56) References Cited

U.S. PATENT DOCUMENTS

2006/0133543 A1* 6/2006 Linsky ................. H04B 17/336
375/341
2015/0244481 A1 8/2015 Tyson et al.
(Continued)

OTHER PUBLICATIONS

"Specification of the Bluetooth System, Bluetooth Core Specification Addendum 5", Bluetooth SIG, Dec. 15, 2015, pp. 1-18.
(Continued)

*Primary Examiner* — Ricky Q Ngo
*Assistant Examiner* — Stephen N Steiner
(74) *Attorney, Agent, or Firm* — Charles F. Koch; Charles A. Brill; Frank D. Cimino (57) ABSTRACT

A method for pseudo channel hopping in a node of a wireless mesh network is provided that includes scanning each channel of a plurality of channels used for packet transmission by the node, wherein each channel is scanned for a scan dwell time associated with the channel, updating statistics for each channel based on packets received by the node during the scanning of the channel, and changing scan dwell times of the plurality of channels periodically based on the statistics.

18 Claims, 6 Drawing Sheets

Related U.S. Application Data (60) Provisional application No. 62/329,950, filed on Apr. 29, 2016.

(51) Int. Cl.

| | | |
|---|---|---|
| *H04W 4/80* | (2018.01) | |
| *H04L 43/0823* | (2022.01) | |
| *H04L 1/20* | (2006.01) | |
| *H04B 17/26* | (2015.01) | |
| *H04L 1/00* | (2006.01) | |
| *H04L 43/16* | (2022.01) | |
| *H04W 40/22* | (2009.01) | |
| *H04B 1/715* | (2011.01) | |
| *H04L 49/15* | (2022.01) | |
| *H04W 84/18* | (2009.01) | |

(52) U.S. Cl.
CPC ............ *H04L 1/0002* (2013.01); *H04L 1/203* (2013.01); *H04L 43/0847* (2013.01); *H04L 43/16* (2013.01); *H04W 4/80* (2018.02); *H04B 2001/7154* (2013.01); *H04L 1/0061* (2013.01); *H04L 49/1584* (2013.01); *H04Q 2213/13215* (2013.01); *H04W 40/22* (2013.01); *H04W 84/18* (2013.01)

(58) Field of Classification Search
CPC .... H04W 40/22; H04W 84/18; H04L 1/0002; H04L 1/203; H04L 43/0847; H04L 43/16; H04L 1/0061; H04L 49/1584; H04Q 2213/13215

See application file for complete search history.

(56) References Cited

U.S. PATENT DOCUMENTS

| | | |
|---|---|---|
| 2015/0245296 A1 | 8/2015 | Tyson et al. |
| 2015/0245351 A1 | 8/2015 | Banerjea et al. |
| 2015/0245369 A1 | 8/2015 | Heydon |
| 2016/0302195 A1 | 10/2016 | Zhang et al. |
| 2017/0127445 A1* | 5/2017 | Lee .......................... H04L 43/16 |
| 2017/0245204 A1* | 8/2017 | Kumar ................... H04W 48/16 |

OTHER PUBLICATIONS

"Specification of the Bluetooth System, Supplement to the Bluetooth Core Specification", Bluetooth SIG, Jul. 14, 2015, pp. 1-36.
Marek Wierzbicki, "Bluetooth Mesh—What's that noise about?", LEDs Magazine, Issue 86, Mar. 29, 2016, pp. 35-40.
"CC2640 SimpleLink Bluetooth Wireless MCU", SWRS176B, Texas Instruments, Inc., Feb. 2015, Revised Jul. 2016, pp. 1-61.
Carles Gomez, et al, "Overview and Evaluation of Bluetooth Low Energy: An Emerging Low-Power Wireless Technology", Sensors 2012, 12(9), Aug. 29, 2012, pp. 11734-11753.
Charles Hodgdon, "Ad aptive Frequency Hopping for Reduced Interference between Bluetooth and Wireless LAN", Design & Reuse, May 2003, pp. 1-4.
"Specification of the Bluetooth System", Version 4.2, vols. 0-2, Bluetooth SIG, Dec. 2, 2014, pp. 1-1692.
"Specification of the Bluetooth System", Version 4.2, vol. 3, Parts A-G, Bluetooth SIG, Dec. 2, 2014, pp. 1-585.
"Specification of the Bluetooth System", Version 4.2, vol. 3, Part H, Bluetooth SIG, Dec. 2, 2014, pp. 1-118.
"Specification of the Bluetooth System", Version 4.2, vols. 4-7, Bluetooth SIG, Dec. 2, 2014, pp. 1-377.

* cited by examiner

PSEUDO CHANNEL HOPPING USING SCAN DWELL TIMES IN MESH NETWORKS WITHOUT TIME SYNCHRONIZATION

CROSS-REFERENCE TO RELATED APPLICATIONS

This application is a continuation of U.S. patent application Ser. No. 15/424,692, filed Feb. 3, 2017, which claims the benefit of U.S. Provisional Patent Application No. 62/329,950, filed Apr. 29, 2016, each of which is incorporated by reference herein in its entirety.

BACKGROUND OF THE DISCLOSURE

Field of the Disclosure

Embodiments of the present disclosure generally relate to wireless networks, and more specifically relate to wireless mesh networks.

Description of the Related Art

Providing network connectivity to everyday objects or things, and forming an internet of these connected things has been a vision for many. To form this internet of connected things, the things need to be able to communicate with each other. Mesh networking is a critical requirement to enable this vision as such everyday things may have limited communication range and may need to communicate with devices beyond the limited communication range. Another key requirement to enable this vision is the ability for end user hand held devices such as smart phones and tablets to communicate with devices in the mesh network for ease of use and simplicity of deployment.

A standardized wireless mesh technology based on Bluetooth Low Energy (BLE), also referred to as Bluetooth Smart, is currently being designed to meet these requirements. The BLE wireless mesh technology uses a flooding protocol based on a small subset of BLE functionality. Network flooding can result in contention and congestion in the mesh network leading to packet loss, especially as the scale of the network increases. Further, BLE operates in the same 2.4 GHz radio band as other wireless technologies such as Bluetooth and IEEE 802.11. Thus, devices communicating in a BLE wireless mesh network may encounter interference when deployed in environments where these other wireless technologies are used.

SUMMARY

Embodiments of the present disclosure relate to methods, apparatus, and computer readable media for pseudo channel hopping using scan dwell time in mesh networks without time synchronization. In one aspect, a method for pseudo channel hopping in a node of a wireless mesh network is provided that includes scanning each channel of a plurality of channels used for packet transmission by the node, wherein each channel is scanned for a scan dwell time associated with the channel, updating statistics for each channel based on packets received by the node during the scanning of the channel, and changing scan dwell times of the plurality of channels periodically based on the statistics.

In one aspect, a wireless communication device configured to perform pseudo channel hopping in a wireless mesh network is provided that includes a memory storing software instructions for causing the wireless communication device to perform pseudo channel hopping, wherein execution of the software instructions causes the wireless communication device to scan each channel of a plurality of channels used for packet transmission by the wireless communication device, wherein each channel is scanned for a scan dwell time associated with the channel, update statistics for each channel based on packets received by the wireless communication device during the scanning of the channel, and change scan dwell times of the plurality of channels periodically based on the statistics, and a processor coupled to the memory to execute the software instructions.

In one aspect, a non-transitory computer readable medium storing software instructions is provided. The software instructions, when executed by a processor of a wireless communication device in a wireless mesh network, cause a method for pseudo channel hopping to be performed that includes scanning each channel of a plurality of channels used for packet transmission by the node, wherein each channel is scanned for a scan dwell time associated with the channel, updating statistics for each channel based on packets received by the node during the scanning of the channel, and changing scan dwell times of the plurality of channels periodically based on the statistics.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Specific embodiments of the disclosure will now be described in detail with reference to the accompanying figures. Like elements in the various figures are denoted by like reference numerals for consistency.

As previously mentioned, devices communicating in a wireless mesh network based on Bluetooth Low Energy (BLE) may encounter interference from other wireless technologies operating in the same 2.4 GHz radio band. Channel hopping is a known technique for diminishing the effect of interference. However, typical channel hopping techniques require time synchronization between a transmitting device and a receiving device and/or apriori knowledge of the sequence in which the channels are hopped, neither of which is provided in a BLE based wireless mesh network.

Embodiments of the disclosure provide pseudo channel hopping that may diminish the effects of interference from other wireless technologies. In a BLE based wireless mesh network, all mesh packets are transmitted in the three BLE advertisement channels and the three channels are scanned to receive transmitted packets. In embodiments of the disclosure, a scan dwell time may be assigned to each channel. In some embodiments, the pseudo channel hopping involves random selection of the channel to be scanned when the dwell time of the currently scanned channel ends. In some embodiments, the pseudo channel hopping involves cycling through the channels in a round robin fashion such that when the dwell time of the currently scanned channel ends, scanning is initiated in the next channel in the rotation. In some embodiments, statistics such as packet success rate and/or cyclic redundancy check (CRC) error rate are maintained for each of the three BLE advertisement channels. In some such embodiments, the pseudo channel hopping involves selecting the next channel to be scanned based on the statistics. In some such embodiments, the pseudo channel hopping involves using the statistics to periodically adjust the scan dwell time for each channel.

Figure 1:
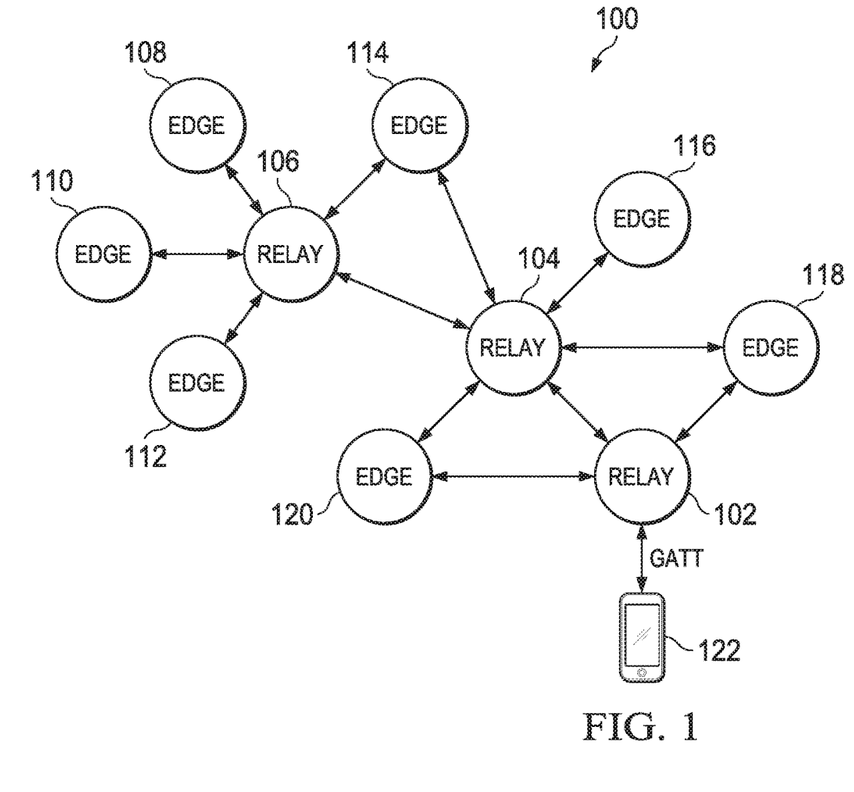
FIG. 1 is an example of a wireless mesh network based on Bluetooth Low Energy (BLE)

FIG. 1 depicts an example wireless mesh network 100 based on BLE. As previously mentioned, the emerging BLE based wireless mesh network technology uses a flooding protocol based on a small subset of BLE. As BLE is a known technology, high level descriptions of those aspects of relevance to the current disclosure are provided herein. More information regarding BLE may be found, for example, in "Specification of the Bluetooth System, Covered Core Package," Version 4.2, The Bluetooth Special Interest Group, Kirkland, Wash., Dec. 2, 2014, which is incorporated by reference herein.

Each of the nodes 102-120 is a device configured to communicate in the mesh network using the BLE based flooding protocol. For example, a node may be a control device such as a light bulb or a door lock or a sensing device such as a smoke alarm or door sensor in an alarm system or may be both a control device and a sensing device such as a thermostat or a base station in an alarm system. An external Bluetooth enabled device 122 such as a smart phone or tablet may communicate with nodes in the mesh network 100 via a node operating as a central hub for the mesh network 100, i.e., node 102. The communication between the hub node 102 and the Bluetooth enabled device 122 may be per the Bluetooth Generic Attribute Profile (GATT).

All transmissions from any node in the mesh network 100 are broadcast transmissions and are transmitted in all three advertisement channels of BLE, i.e., channels 37, 38, and 39, using BLE non-connectable undirected advertisement packets. An example of such a packet is described herein in reference to FIG. 2. The advertisement packets are transmitted on each advertisement channel with a time interval between packets having both a fixed interval and a random delay. The random delay helps reduce the possibility of collisions between advertisement packets transmitted by different nodes.

An advertisement packet broadcast by a node may be received by any relay node within radio range of the broadcasting node, even if the node is not the intended recipient, i.e., destination, of the packet. The arrows between the nodes in the mesh network 100 indicate nodes that are within radio range of each other. For example, nodes 108, 110, 112, 114, and 104 are within radio range of node 106 and may directly receive any advertisement packet broadcast by node 106. The other nodes in the mesh network 100 do not directly receive advertisement packets broadcast by node 106.

Any node in the mesh network 100 configured to receive packets in the mesh network 100 receives advertisement packets in one of the BLE advertisement channels. That is, nodes in the mesh network 100 that expect to receive advertisement packets "listen" for packets in the advertisement channels in BLE scan mode. In addition, some nodes in the mesh network 100 are configured to rebroadcast, i.e., relay, a received advertisement packet when the node is not the intended recipient of the packet. Such nodes may be referred to as relay nodes. In the mesh network 100, nodes 102, 104, 106 are relay nodes. Nodes 108-120 are not relay nodes and are referred to as edge nodes. The presence of the relay nodes allows the mesh network 100 to be flooded with relayed advertisement packets.

Network flooding can result in congestion in the mesh network 100, especially since packets are transmitted in the same frequency range, i.e., the same BLE advertisement channels. Two known techniques may be used in combination in the wireless mesh network 100 to help alleviate congestion: time to live (TTL) and caching. Each transmitted packet is assigned a TTL, i.e., a hop count, indicating how many times the packet should be relayed, and each relay node maintains a cache of unique identifiers for recently received packets. Each time a relay node receives a packet, the cache is checked to determine if the packet was previously received or is a new packet. If the packet is new and is not at the intended destination, the relay node adds a unique identifier for the packet to the cache, decrements the TTL, and relays the packet if the TTL is not zero. If the packet was previously received by the relay node, the packet is ignored. If the packet is new and is at the intended destination, the relay node adds a unique identifier for the packet to the cache and provides the packet to an application on the node for further processing.

As mentioned earlier, the BLE advertisement packets are transmitted on the three BLE advertisement channels. Nodes scanning for packets scan on one of the three channels for at least the duration of transmission of all three channels. That is, the minimum dwell time for scanning a channel is the time needed to transmit on all three channels. However, there may be external interference on the scanned channel. In embodiments of the disclosure, pseudo channel hopping is implemented in the mesh network 100 to dynamically change the scanned channel. Embodiments of pseudo channel hopping that may be implemented by a relay node 104, 106, 108 are described herein.

Figure 2:
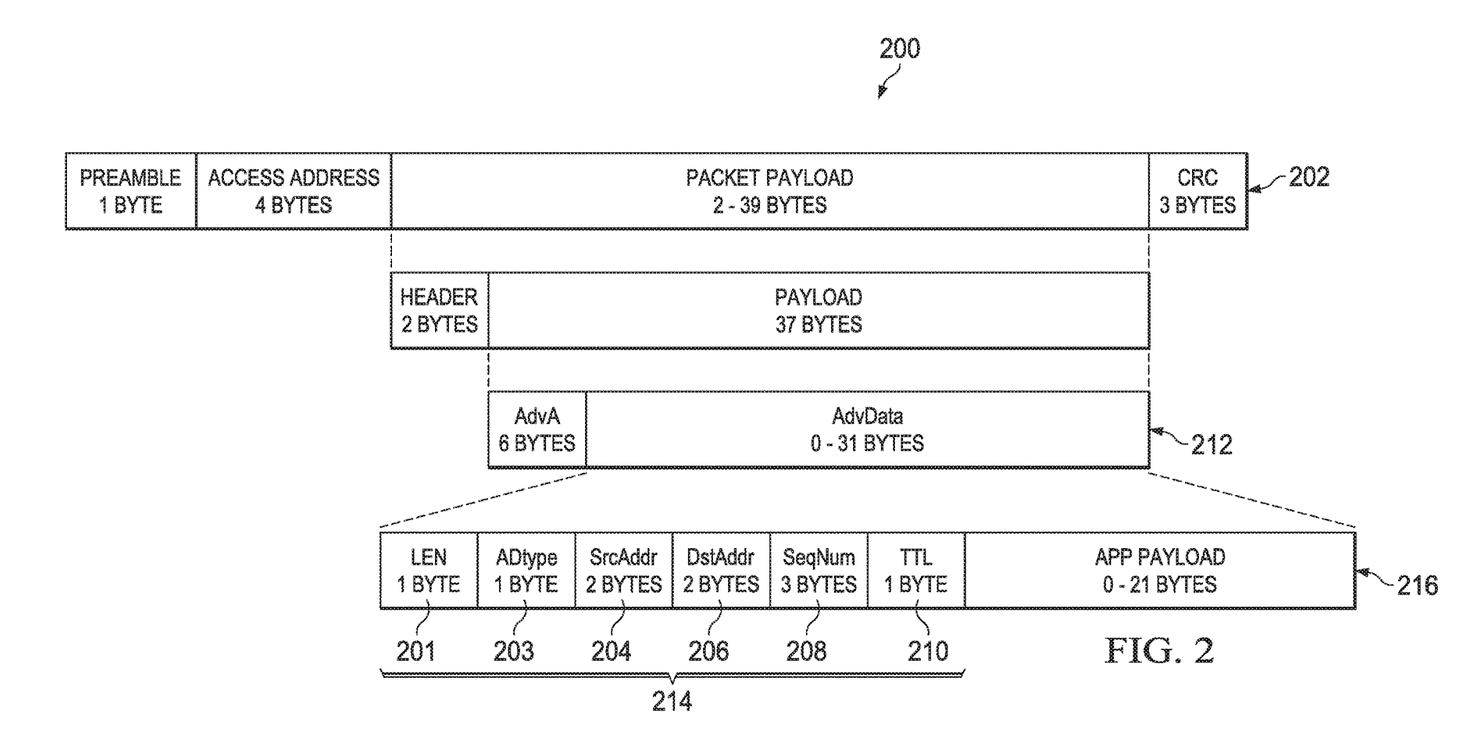
FIG. 2 is an example packet format that may be used in the BLE wireless mesh network of FIG. 1.

FIG. 2 is an example of a packet format 200 that may be used in the BLE wireless mesh network 100 of FIG. 1. Ignoring the preamble, access address, header advertisement address (AdvA), and CRC 202, the mesh advertisement data payload 212 is thirty-one bytes. The advertisement data payload 212 includes a header 214 and a mesh application payload 216. The header 214 includes the length 201, the type 203, the source address 204 indicating the mesh address of the sender of the packet, the destination address 206 indicating the mesh address of the node for which the packet is intended, the sequence number 208 indicating the sequence number of the packet in a sequence of packets transmitted from the source node to the destination node, and the TTL 210.

Figure 3:
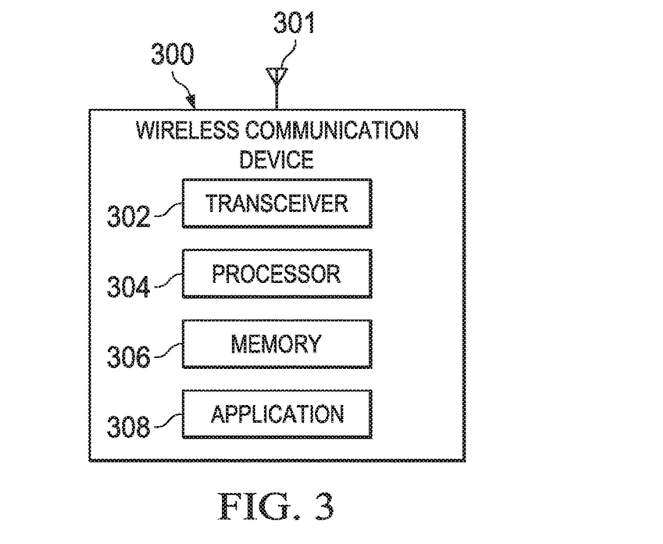
FIG. 3 is a simplified block diagram of an example wireless communication device.

FIG. 3 is a simplified block diagram of an example wireless communication device 300 suitable for use as a relay node 104, 106, 108 in the BLE mesh network 100 of FIG. 1. The wireless communication device 300 includes an antenna 301, a transceiver component 302, a processor component 304, a memory component 306, and an application component 308. The antenna 301 is configured to receive and transmit radio frequency (RF) signals. The transceiver component 302 is configured to modulate received RF signals and to modulate RF signals to be transmitted. The memory component 306 may include any suitable memory such as random access memory (RAM), read-only memory (ROM), flash memory, or the like, or a combination of such devices. The application component 308 is configured to perform the function of the wireless communication device 300, e.g., controlling an alarm, controlling a light, temperature sensing, etc.

The processor component 304 is configured to process received packets and to perform management functions such as causing the transmission of advertisement packets and selection of BLE channels to be scanned for advertisement packets. The processor component 304 may include one or more suitable processors such as programmable general-purpose or special-purpose microprocessors, digital signal processors (DSPs), application specific integrated circuits (ASICs), programmable controllers, programmable logic devices (PLDs), or the like, or a combination of such devices. The processor module 304 is further configured to execute software instructions stored in the memory component 306 that cause the wireless communication device to perform a pseudo channel hopping embodiment as described herein.

Figure 4:
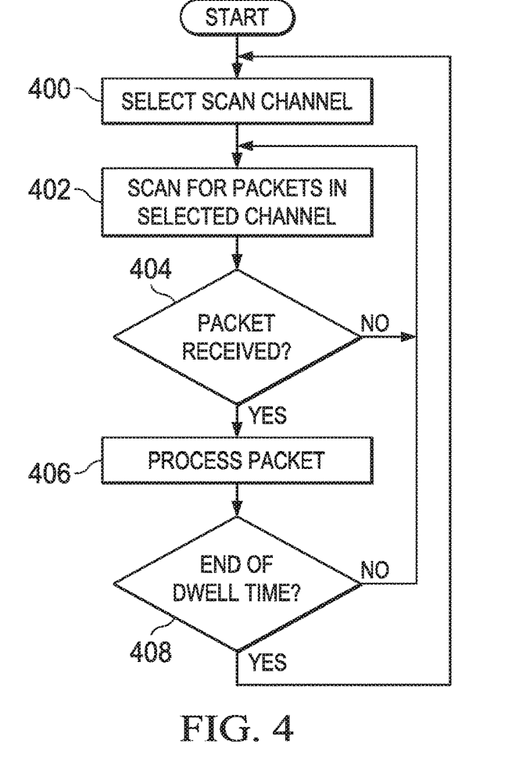
FIG. 4 is a flow diagram of a method for pseudo channel hopping in a relay node of a BLE wireless mesh network.

FIG. 4 is a flow diagram of a method for pseudo channel hopping in a relay node of a BLE wireless mesh network such as the BLE wireless mesh network 100 of FIG. 1. The method assumes that predetermined default scan dwell times are assigned to each of the three BLE channels when the relay node is powered up. In some embodiments, the default dwell time is the same for all three channels. In some embodiments, the scan dwell times for the channels may be changed during operation of the relay node.

Initially, a channel to be scanned is selected 400 from the three BLE channels. In some embodiments, the channel to be scanned is selected randomly. In some embodiments, the channels are scanned in round robin order beginning with channel 37 and the next channel in the round robin order is selected. In some embodiments, the scan channel is selected based on channel statistics as described herein.

The selected channel is then scanned 402 for packets until the scan dwell time for the channel is ended 408. If a packet is received 404 during the scan dwell time, the packet is processed 406. A method for processing a received packet on a relay node is described in reference to the method of FIG. 5. When the scan dwell time for the currently selected channel ends 408, another channel is selected 400.

The scan dwell time may be implemented using a clock timer. In such embodiments, when scanning is initiated in a selected channel, the timer is started with the scan dwell time for the channel. When the timer expires, the scan dwell time is ended for the channel and another channel is selected.

Figure 5:
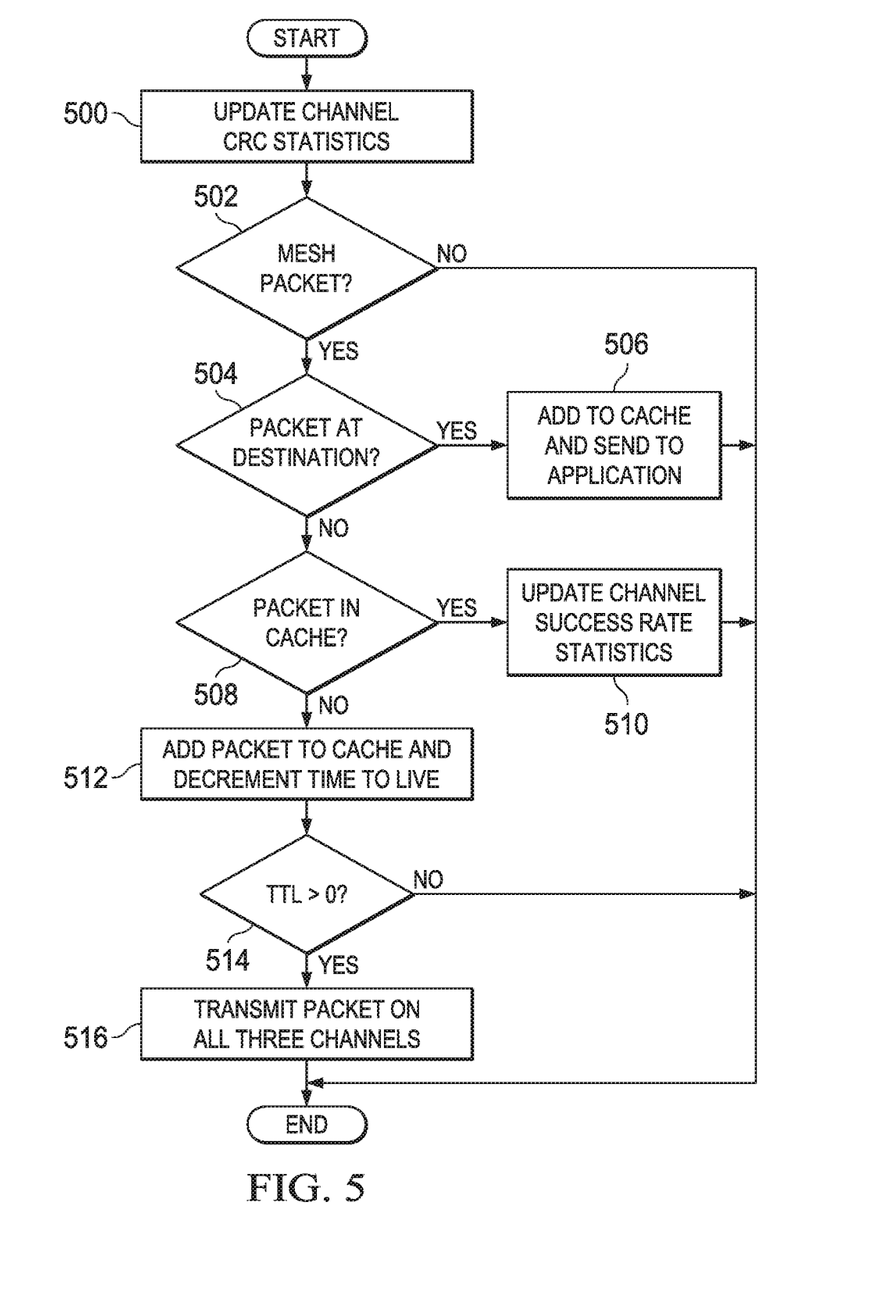
FIG. 5 is a flow diagram of a method for processing a packet received in a relay node of a BLE wireless mesh network.

FIG. 5 is a flow diagram of a method for processing a packet received in a relay node of a BLE wireless mesh network such as the BLE wireless mesh network 100 of FIG. 1. The method assumes that statistics are maintained for each of the three BLE channels. The statistics data for each channel may include a scan dwell time for the channel, a packet success count, and/or a count of the number of packets received with a CRC error. The packet success count for a channel is a count of the number of packets received in the channel that were previously transmitted by the relay node. The packet success count and the scan dwell time may be used to determine the packet success rate for the channel, i.e., packet success rate is defined as the packet success count by the node divided by the dwell time. The statistics may further include a packet receive history for the destination address of each packet received on the channel that includes the destination address, the sequence number of the last packet received with the destination address, and a sequence number history recording the sequence numbers of successfully received packets in the sequence.

Initially, the CRC statistics of the channel in which the packet was received are updated 500. A method for updating CRC statistics is described in reference to FIG. 7. If the received packet is not a mesh packet 502, no further processing of the packet is performed. If the packet is a mesh packet, then the destination address of the packet is checked 504 to determine if the relay node is the final destination of the packet. If the relay node is the final destination, packet information is added to the cache of received packets and the packet is sent to the application component of the relay node for processing.

If the relay node is not the final destination of the packet, then the cache is checked 508 to determine if the packet has been previously received by the relay node. If the packet has been previously received by the relay node, then the success rate statistics for the channel are updated 510 and no further processing of the packet is performed. A method for updating channel success rate statistics is described in reference to FIG. 6. The presence of the packet in cache is an indication that the node may have previously relayed the packet and other relay nodes within radio range have successfully received the relayed packet and retransmitted it.

If the packet has not been previously received by the node, the packet is added 512 to the cache of received packets and the time to live (TTL) of the packet is decremented. If the TTL is greater than zero 514, the packet is transmitted 516 on the three BLE channels. Otherwise, no further processing of the packet is performed.

Figure 6:
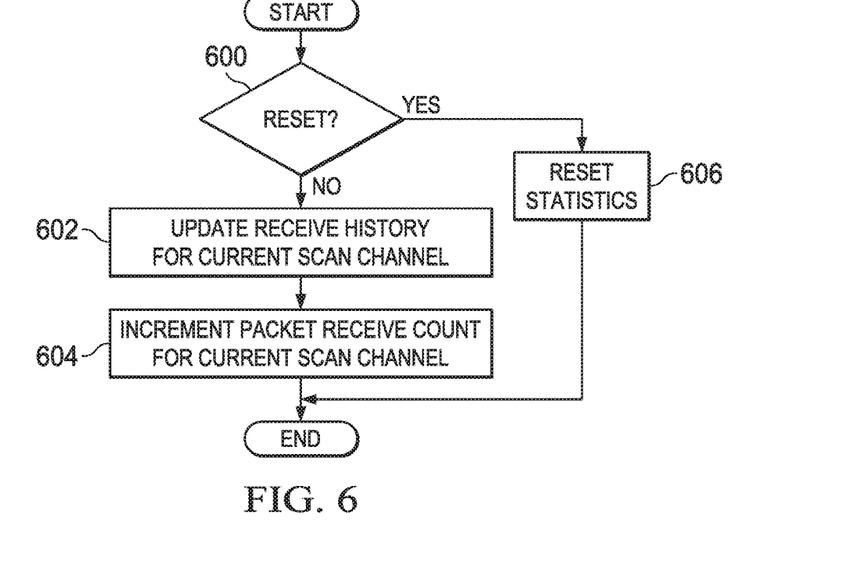
FIG. 6 is a flow diagram of a method for updating success rate statistics for a channel.

FIG. 6 is a flow diagram of a method for updating success rate statistics for a channel. The success rate statistics for a channel include the packet success count and the packet receive history for each destination address. Initially, a determination 600 is made as to whether the channel statistics should be reset. The channel statistics may be reset periodically as channel conditions may change over time and the accumulated statistics may no longer represent the current channel conditions. Any suitable period of time between resets may be used.

If the channel statistics are to be reset, then the statistics for all three channels are reset 606 and no updating is performed. That is, the CRC error count and the packet success count are reset to zero and the packet receive history is cleared for each channel. In addition, in those embodiments in which the scan dwell time is changed based on the channel statistics, the scan dwell time for each channel is reset to the default scan dwell time. Such embodiments are described in reference to the method of FIG. 11.

If the channel statistics are not to be reset, then the packet receive history for the current scan channel is updated 602 and the packet success count for the current scan channel is incremented 604 by one.

Figure 7:
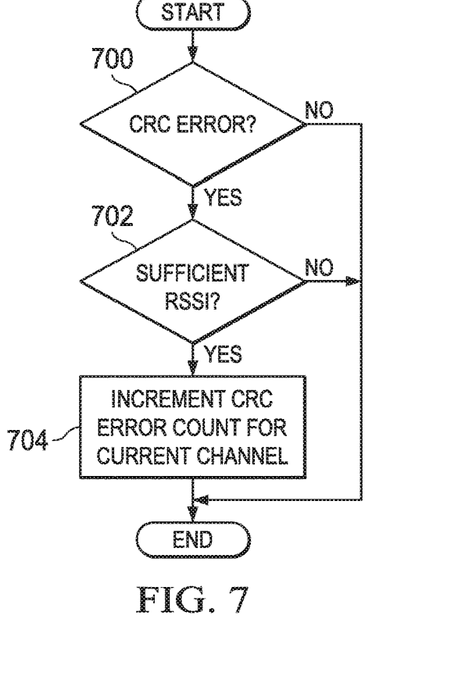
FIG. 7 is a flow diagram of a method for updating CRC statistics for a channel.

FIG. 7 is a flow diagram of a method for updating CRC statistics for a channel. Initially, the received packet is checked 700 for a CRC error. This check may be made by computing a CRC for the packet and comparing the computed CRC to the CRC transmitted with the packet. If there is no CRC error, the CRC error count is not changed. Otherwise, the received signal strength indicator (RSSI) of the packet is checked 702 for sufficient signal strength. This check may be made by comparing the RSSI to a predetermined RSSI threshold. If the RSSI is not sufficient, the CRC error count is not changed. Otherwise, the CRC error count for the current scan channel is incremented 704 by one.

Figure 8:
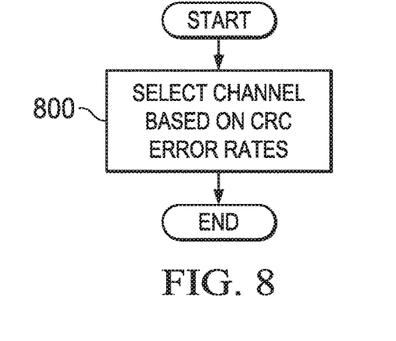
FIG. 8 is a flow diagram of a method for selecting a scan channel based on statistics maintained for each channel.
Figure 9:
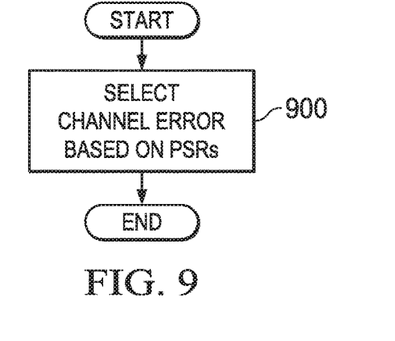
FIG. 9 is a flow diagram of a method for selecting a scan channel based on statistics maintained for each channel.
Figure 10:
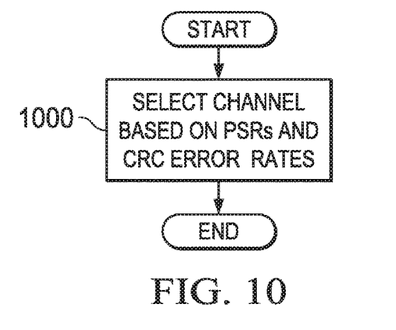
FIG. 10 is a flow diagram of a method for selecting a scan channel based on statistics maintained for each channel.

FIGS. 8, 9, and 10 are flow diagrams of methods for selecting a scan channel based on statistics maintained for each of the BLE channels. Referring first to FIG. 8, the scan channel may be selected 800 based solely on CRC error rates of the channels. That is, the channel with the lowest CRC error count may be selected. In such embodiments, the packet success rate statistics may not be maintained.

Referring now to FIG. 9, the scan channel may be selected 900 based solely on the packet success rate (PSR) statistics of the three channels. That is, the channel with highest PSR may be selected. As previously mentioned, the packet success rate of a channel is the packet success count divided by the dwell time for the channel. In such embodiments, the CRC error statistics may not be maintained.

Referring now to FIG. 10, the scan channel may be selected 1000 based on both the packet success rates (PSRs) and the CRC error rates of the channels. That is, the channel with highest PSR may be selected. However, if the PSRs of the channels are similar, i.e., equal or within a predetermined delta value of each other, the CRC error rates may be used to select the channel. Or, if the PSRs of the channels are too low, thus indicating very little mesh packet traffic, the CRC error rates may be used to select the channel. The determination of whether or not the PSR of a channel is too low may be made by comparing the PSR to a predetermined PSR threshold. If CRC error rates are similar or too high (as compared to a predetermined CRC error rate threshold), then the scan channel may be selected using other criteria, e.g., randomly or the next scan channel numerically in a round robin sequence.

Figure 11:
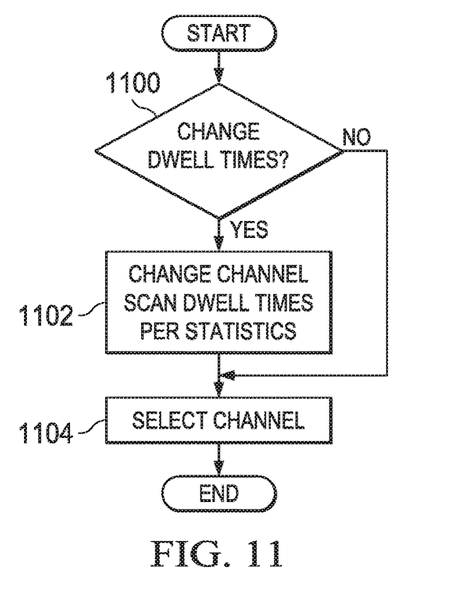
FIG. 11 is a flow diagram of a method for selecting a scan channel.

FIG. 11 is a flow diagram of a method for selecting a scan channel. In this method, rather than selecting a scan channel based on the statistics maintained for the channels, the scan dwell times for the channels are changed periodically based on the statistics. Initially, a determination 1100 is made as to whether to change the scan dwell times. In some embodiments, the scan dwell times are changed after a predetermined time interval, e.g., every fifteen seconds. Any suitable time interval may be used.

If the scan dwell times are to be changed, then each channel scan dwell time may be changed 1102 based on channel statistics for each channel. Methods for changing scan dwell times based on channel statistics are described below in reference to FIGS. 12-14. After changes are made to the scan dwell times as needed, a scan channel is selected 1104 according to some criteria. In some embodiments, the channel to be scanned is selected randomly. In some embodiments, the channels are scanned in round robin order beginning with channel 37 and the next channel in the round robin order is selected.

Figure 12:
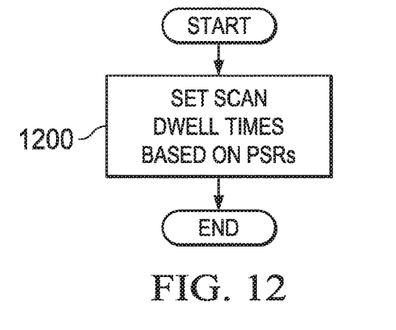
FIG. 12 is a flow diagram of a method for changing scan dwell times based on statistics maintained for each channel.
Figure 13:
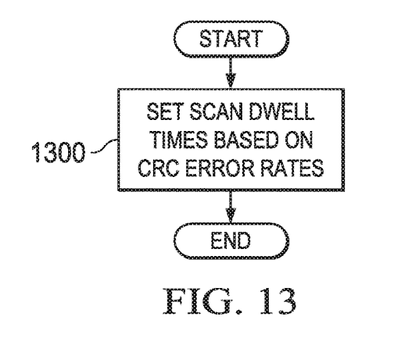
FIG. 13 is a flow diagram of a method for changing scan dwell times based on statistics maintained for each channel.
Figure 14:
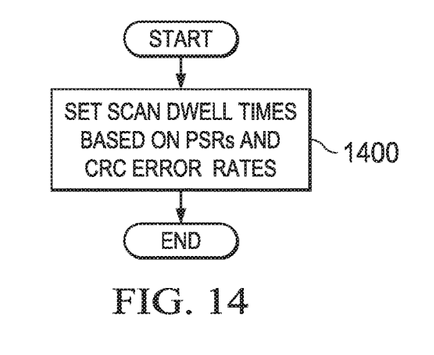
FIG. 14 is a flow diagram of a method for changing scan dwell times based on statistics maintained for each channel.

FIGS. 12, 13, and 14 are flow diagrams of methods for changing scan dwell time based on the statistics maintained for each of the BLE channels. Referring first to FIG. 12, the scan dwell times may be changed 1200 based solely on the PSRs of the channels. That is, the scan dwell times of the channels may be increased or decreased based on a predetermined step size if one or more channels have a low PSR as compared to a predetermined PSR threshold. Any suitable step size may be used. In some embodiments, the step size may be a percentage of the default scan dwell time, e.g., ten percent of the default scan dwell time. If all three channels have low PSRs or acceptable PSRs, then no change is made to the scan dwell times.

For example, assume that all three channels have a default scan dwell time of five seconds and the step size is 0.5 seconds. If channel 37 has a low PSR as compared to the PSR threshold, the scan dwell time for channel 37 is reduced to 4.5 seconds and the scan dwell time of the channels 38 and 39 are each increased to 5.25 seconds. If two channels have low PSRs, then the scan dwell times for those two channels are each reduced by the step size of 0.5 seconds and two times the step size, i.e., 1 second, is added to the scan dwell time for the other channel.

Referring now to FIG. 13, the scan dwell times may be changed 1300 based solely on the CRC error rates of the channels. That is, the scan dwell times of the channels may be increased or decreased based on the previously described predetermined step size if one or more channels have a high CRC error rate as compared to a predetermined CRC error rate threshold. If all three channels have high CRC error rates or acceptable CRC error rates, then no change is made to the scan dwell times.

Referring now to FIG. 14, the scan dwell time may be changed 140 based on both the PSRs and the CRC error rates of the channels. That is, the scan dwell times of the channels may be increased or decreased based on the predetermined step size if one or two channels have a low PSR as compared to the predetermined PSR threshold. However, if all three channels have a low PSR, channel CRC error rates are used to determine changes to the channel scan dwell times as described in reference to FIG. 13. If all three channels also have high CRC error rates, the scan dwell times are not changed.

In some embodiments, there is a minimum scan dwell time for a channel. The minimum scan dwell time is the time needed for a node to transmit an advertisement packet on all three channels. Thus, the scan dwell time for a channel will not be reduced below this minimum even if the channel has a low PSR.

Figure 15:
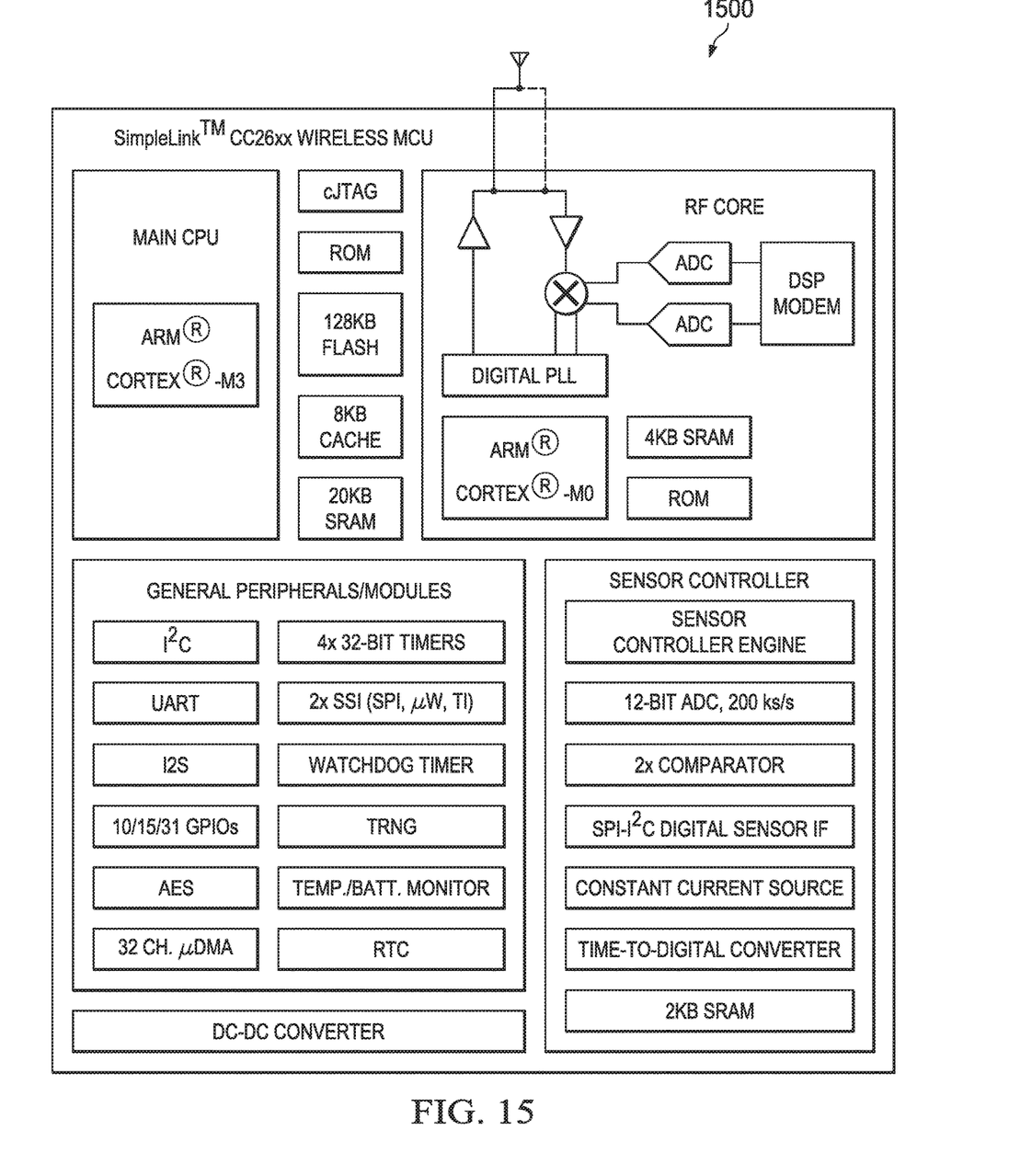
FIG. 15 is a simplified block diagram of an example wireless communication device.

FIG. 15 is a simplified block diagram of an example wireless sensor device 1500, e.g., a wireless communication device, that may be deployed as a relay node in a wireless mesh network such as the example mesh network 100 of FIG. 1 and may be configured to perform pseudo channel hopping as described herein. More specifically, the example wireless sensor device 1500 may be embodied as a CC26xx SimpleLink™ Multistandard wireless microcontroller (MCU) integrated circuit (IC) available from Texas Instruments. The CC26xx family of ultralow-power microcontrollers includes multiple devices featuring an ultralow power CPU and different peripherals targeted for various applications. The particular MCU depicted is the CC2650. A brief description of the CC2650 is provided herein. A detailed description of the CC2650 is provided in Texas Instruments publication SWRS158, "CC2650 SimpleLink™ Multistandard Wireless MCU," February 2015, which is incorporated by reference herein.

The MCU 1500 incorporates a 32-bit ARM® Cortex®-M3 as the main processor and a peripheral feature set that includes an ultra-low power sensor controller for interfacing external sensors and/or collecting analog and digital data autonomously while the rest of the system is in sleep mode. The MCU 1500 also incorporates an RF core based on an ARM® Cortex®-M0 processor. The RF core is designed to autonomously handle time critical aspects of various radio protocols. The RF core includes a dedicated 40 KB static random access memory (SRAM) and a dedicated read-only memory (ROM).

The MCU 1500 also incorporates 128 KB of flash memory that provides nonvolatile storage for code and data, 20 KB of SRAM that can be used for both storage of data and execution of code, and a ROM storing a real-time operating system kernel. General peripherals/modules on the MCU 600 may include a 12-bit A/D converter, a 16-channel comparator with voltage reference generation and hysteresis capabilities, interfaces for SPI, Microwire, and UART protocols, internal direct memory access (DMA), a real-time clock, multiple $16/32$-bit timers, and more.

Software instructions implementing pseudo channel hopping as described herein may be stored in a computer readable medium on the MCU 1500 such as the flash memory, the SRAM, or the ROM on the MCU 1500 and executed by the main CPU.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein for a BLE based wireless mesh network. One of ordinary skill in the art will understand embodiments for wireless mesh networks based on protocols with no time synchronization and/or apriori knowledge of channel hopping sequence.

In another example, embodiments have been described herein assuming only three communication channels. One of ordinary skill in the art will understand embodiments having more than three communication channels.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A method comprising:
   receiving, by a node, a packet via a channel of a network;
   determining whether the packet has been previously received by the node;
   determine a packet success rate for the channel based on whether the packet has been previously received by the node;
   setting a dwell time of the node for the channel based on the packet success rate;
   scanning, by the node, the channel for the dwell time; and
   selecting a next channel for the node based on the packet success rate.

2. The method of claim 1, wherein:
   the packet is a first packet;
   the method further comprises:
      receiving, by the node, a second packet; and
      storing the second packet in a cache of the node; and
   the determining of whether the first packet has been previously received by the node includes comparing the second packet in the cache to the first packet.

3. The method of claim 2 further comprising transmitting, by the node, the second packet across a plurality of channels.

4. The method of claim 1, wherein the packet has a destination, and the determining of whether the packet has been previously received by the node is performed based on the node not being the destination of the packet.

5. The method of claim 1, wherein:
   the channel is a first channel;
   the packet success rate for the first channel is a first packet success rate; and
   the setting of the dwell time for the first channel is further based on a second packet success rate for a second channel of the network.

6. The method of claim 1, wherein the setting of the dwell time of the node for the channel is further based on a cyclic redundancy check error rate of the channel.

7. The method of claim 1, wherein:
   the packet is a first packet;
   the method further comprises receiving, via the channel, a second packet having a received signal strength; and
   the setting of the dwell time of the node for the channel is further based on the received signal strength of the second packet.

8. The method of claim 1 further comprising determining whether the packet is a mesh packet, wherein the determining of whether the packet has been previously received by the node is performed based on the packet being a mesh packet.

9. The method of claim 1 wherein the channel is a Bluetooth Low Energy network channel.

10. A device comprising:
    at least one processor;
    a non-transitory computer-readable storage medium storing instructions for execution by the processor that, when executed, cause the at least one processor to:
       receive a first packet;

scan a first channel of a plurality of channels for a first dwell time;
receive, via the first channel, a second packet;
determine whether the second packet matches the first packet;
determine a packet success rate for the first channel based on whether the second packet matches the first packet;
set a second dwell time for the first channel based on the packet success rate; and
select a next channel of the plurality of channels based on the packet success rate.

11. The device of claim 10, wherein the device comprises a cache, and the instructions cause the at least one processor to:
store the first packet in the cache; and
determine whether the second packet matches the first packet by comparing the second packet to the first packet stored in the cache.

12. The device of claim 11, wherein the instructions cause the at least one processor to transmit the second packet across the plurality of channels.

13. The device of claim 10, wherein the second packet has a destination, and the instructions cause the at least one processor to:
determine whether the device matches the destination of the first packet; and
perform the determination of whether the second packet matches the first packet based on the device not matching the destination of the second packet.

14. The device of claim 10, wherein:
the plurality of channels includes a second channel; and
the instructions cause the at least one processor to set the second dwell time for the first channel based on a packet success rate for the second channel.

15. The device of claim 10, wherein the instructions cause the at least one processor to set the second dwell time for the first channel based on a cyclic redundancy check error rate of the first channel.

16. The device of claim 10, wherein the instructions cause the at least one processor to set the second dwell time for the first channel based on a received signal strength indicator associated with the first channel.

17. The device of claim 10, wherein the instructions cause the at least one processor to:
determine whether the second packet is a mesh packet; and
perform the determination of whether the second packet matches the first packet based on the second packet being a mesh packet.

18. The device of claim 10, wherein the plurality of channels are Bluetooth Low Energy Network channels.

* * * * *